Dec. 28, 1943.   C. T. PEACOCK   2,337,620
DAMMING ATTACHMENT FOR LISTERS AND LISTER SEEDERS
Original Filed March 12, 1943   3 Sheets-Sheet 1
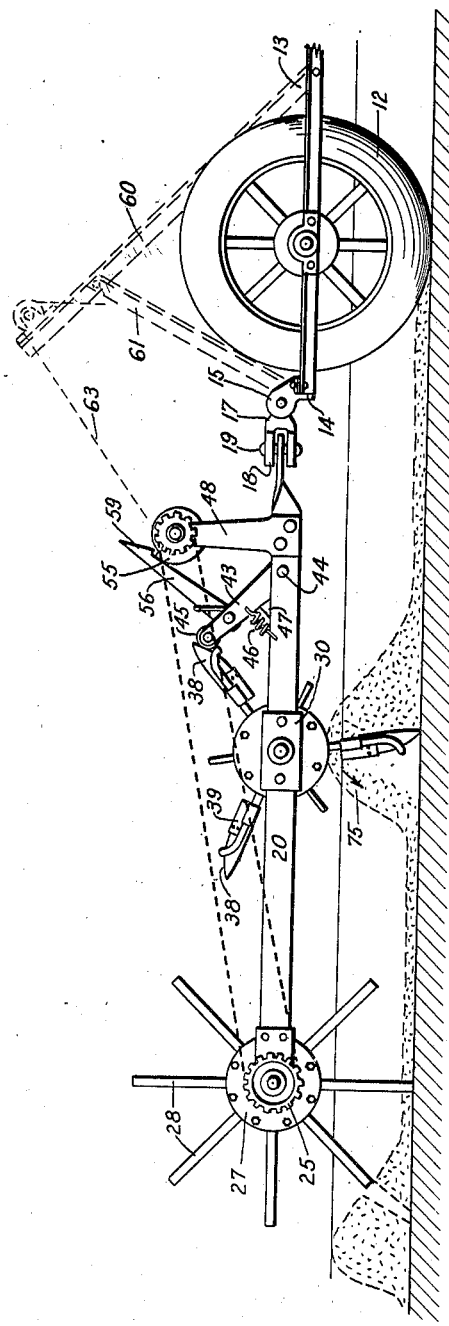
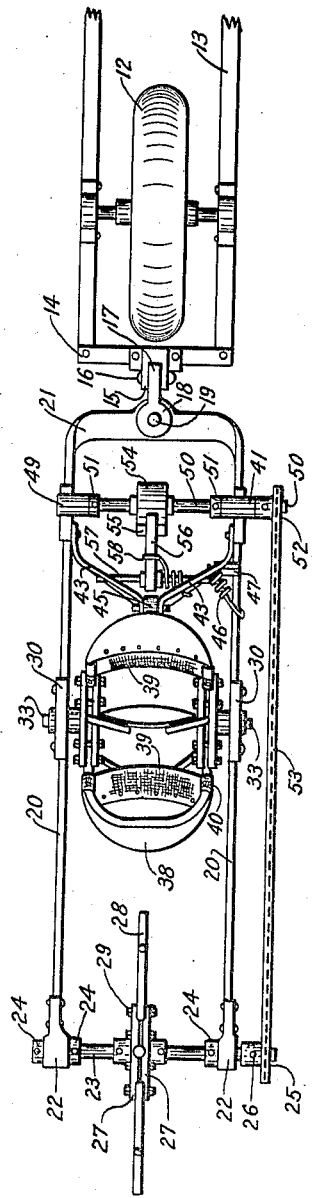
INVENTOR.
CHARLES T. PEACOCK
BY
Martin E. Anderson
Attorney Dec. 28, 1943.  C. T. PEACOCK  2,337,620
DAMMING ATTACHMENT FOR LISTERS AND LISTER SEEDERS
Original Filed March 12, 1943   3 Sheets-Sheet 2
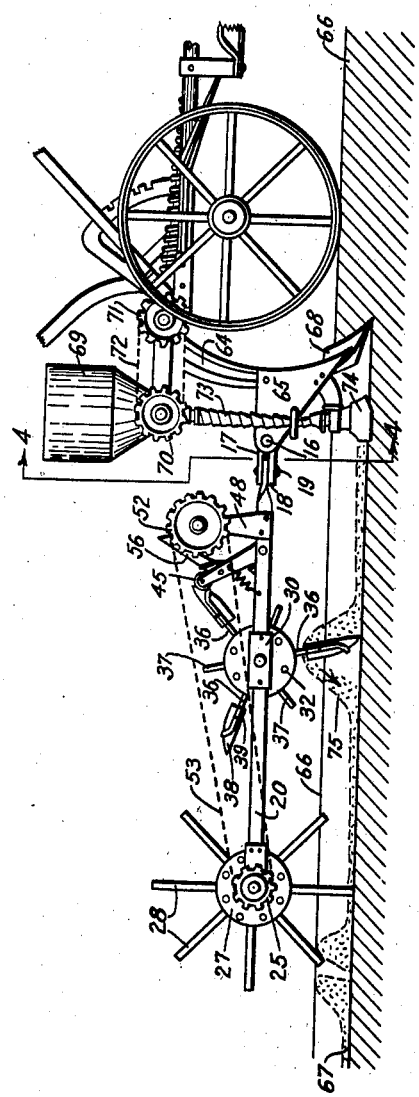
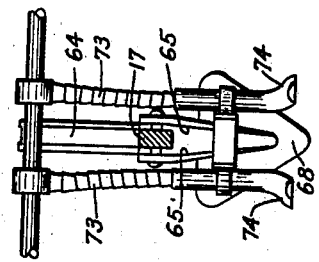
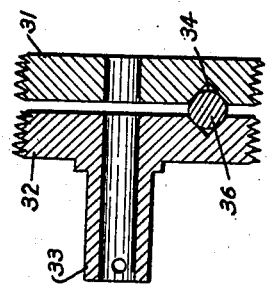
INVENTOR.
CHARLES T. PEACOCK
BY
Martin E Anderson
Attorney Dec. 28, 1943.   C. T. PEACOCK   2,337,620
DAMMING ATTACHMENT FOR LISTERS AND LISTER SEEDERS
Original Filed March 12, 1943    3 Sheets-Sheet 3

INVENTOR.
CHARLES T. PEACOCK
BY
Martin E. Anderson
Attorney

Patented Dec. 28, 1943

2,337,620

UNITED STATES PATENT OFFICE 2,337,620

DAMMING ATTACHMENT FOR LISTERS AND LISTER SEEDERS

Charles T. Peacock, Lincoln County, Colo.

Original application March 12, 1943, Serial No. 478,974. Divided and this application July 30, 1943, Serial No. 496,809

5 Claims. (Cl. 97—55)

This invention relates to improvements in damming devices of the type employed in connection with listers and lister seeders and has reference more particularly to devices of the type shown and claimed in United States Patent No. 2,187,051, granted to me on January 16, 1940, and United States Patent No. 2,284,172, granted May 26, 1942, to W. H. Silver.

This is a division of my application Serial No. 478,974, filed March 12, 1943.

In semiarid regions, such as are found quite extensively in the Middle West, the rainfall is, in most years, insufficient for raising a normal crop and often times a large part of the rain comes in heavy showers that cause erosion without penetrating very deeply into the soil. In order to conserve moisture for land of this type, various damming attachments have been invented for use in connection with listers and lister seeders, for the purpose of producing transverse dams at spaced intervals so as to form basins in which the water will collect and from which it will penetrate into the soil.

Another benefit of such basins is that where the surface is inclined or rolling, the presence of these dams prevent the water from flowing freely in the lister furrows and thereby prevents erosion and also prevents the water from accumulating in low spots from which it evaporates and leaves a hardened top crust that cannot be penetrated by the seed sprouts.

In my patent above referred to a damming attachment has been shown which has been designed especially for use with lister seeders, either of the single or double seed row type.

It is the object of this invention to produce a damming attachment of such construction that it can be readily attached to an ordinary lister or lister seeder, somewhat in the manner shown and claimed in Patent No. 2,308,536 granted to me on January 19, 1943.

Another object of this invention is to produce an attachment that shall be provided with a pin wheel that is permanently attached to the damming device and positioned to the rear of the dammer and so connected with the latter that it will operate a mechanism for releasing the dammer at predetermined intervals.

A still further object of the invention is to produce a damming device that can be readily attached to either a lister seeder or a lister and which can therefore be employed both in seeding operations and in the cultivation of the land during the fallow season.

Another object of this invention is to produce a dammer shovel of such construction that it will automatically clear itself of dirt.

Another object is to produce a damming device and a shovel of such construction that the heights of the dams can be predetermined and made uniform.

Having thus described, in a general way, the object of the invention, the invention will now be described in detail, and for this purpose reference will be had to the accompanying drawings in which the invention has been illustrated, and in which:

Figure 1 is a side elevation showing the damming device attached to a frame and substituted for the damming device shown in Patent No. 2,308,536 above identified;

Figure 2 is a top plan view of the damming device illustrated in Figure 1;

Figure 3 is a side elevation showing the damming device attached to the beam of a lister;

Figure 4 is an end elevation looking in the direction of arrows 4—4, Figure 3;

Figure 5 is a section taken on line 5—5, Figure 7;

Figure 6:
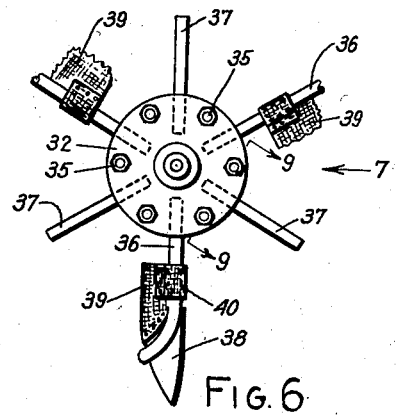
Figure 6 is a side elevation of the dammer.

Referring now to the drawings, reference numeral 12 designates a supporting wheel corresponding to the supporting wheel designated by reference numeral 23 in Patent No. 2,308,536 and reference numeral 13 indicates a frame corresponding to frame member 11 in the last mentioned patent. An angle iron or other structural steel member 14 extends at right angles to the end frame member 13 and secured to this is a steel casting having spaced lugs or ends 15 that are provided with openings for the reception of the bolt or pin 16. Another steel casting is provided with a flattened portion 17 that is positioned between the lugs 15 and which, in addition, is provided with spaced lugs or ends 18 that have openings for the reception of the pin 19.

The damming device or attachment consists of a frame having two spaced side members 20 that are bent into the form of an elongated U.

The base of the U-shaped frame has been designated by reference numeral 21 and is twisted so as to lie in the plane of the frame. The middle of the base 21 is preferably widened and is provided with an opening through which the pin 19 may pass. Secured to the rear ends of the sides 20 are bearings 22 in which the shaft 23 is mounted for rotation. Collars 24 are secured to the shaft to hold it from moving axially in the bearings. One end of the shaft projects to the outside of the frame and to this end a sprocket wheel 25 has been secured by some suitable means as by a pin 26. Secured to shaft 23 is a pin wheel comprising a central hub formed from two plates 27 between which a plurality of spokes or rods 28 are clamped. In the embodiment illustrated eight such rods have been shown projecting forty-five degrees from each other, but a larger number may be used, if desired. The plates 27 are held in clamping engagement with the rods 28 by means of bolts 29

Figure 9:
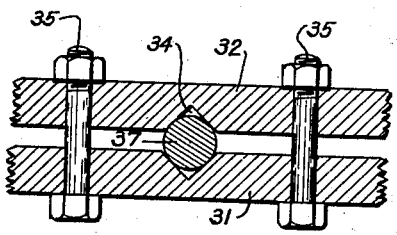
Figure 9 is a section taken on line 9—9, Figure 6.
Figure 8:
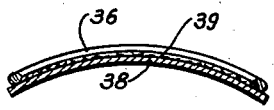
Figure 8 is a section taken on line 8—8, Figure 7.
Figure 10:
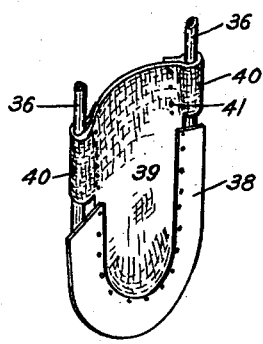
Figure 10 is a perspective view showing the construction of one of the dammer blades or shovels.

Secured to the side members 20 are bearing blocks 30 in which the dammer is mounted for rotation. The dammer consists of two spaced hubs each comprising an inner plate 31 and an outer plate 32. The outer plate has tubular trunnions 33 that are journalled in the bearing blocks 30. The adjacent surfaces of plates 31 and 32 are provided with radially extending V-grooves 34, and intermediate these are openings for the reception of the clamping bolts 35 (Fig. 9). U-shaped steel bars 36 have their ends positioned in correspondingly positioned grooves in the two frame assemblies. In the embodiment shown there are three such U-shaped frame members spaced radially one hundred twenty degrees. Intermediate the U-shaped frame members are turn assisting pins 37 that correspond in function to pins 76 of Patent No. 2,308,536 and to which reference will hereinafter be made.

Figure 7:
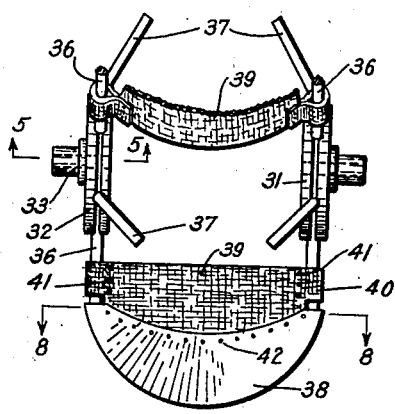
Figure 7 is a view looking in the direction of arrow 7, Figure 6.

The base portions of U-shaped frame members 36 are curved in two directions as shown in Figures 6 and 7 and secured to the curved side of these curved portions are blades 38 which are similarly curved. These blades may be welded to the frame members or secured thereto by any other suitable means. It will be observed from Figure 7 that the blades 38, when viewed in either front or rear elevation, are crescent shaped with the convex portion extending down below the base of the supporting frames 36. That portion of the dammer blades positioned above the crescent shaped steel part 38 and which has been designated by reference numeral 39 is formed from some flexible material, for example, heavy canvas. The ends 40 are bent into the shape of a loop and are held in place by means of rivets 41 forming pockets or openings through which the straight portions of the U-shaped bars 36 project. The downwardly projecting center portion is downwardly convex and overlaps the blade 38, being positioned to the rear of the latter and secured thereto by means of rivets or stove bolts 42. That part of the blades that has been designated by reference numeral 30 can be readily removed and replaced by other and similar parts that are either higher or lower for the purpose of determining the height of the dam in a manner which will hereinafter appear. Any one of the damming blades, which has just been described, can be readily removed and replaced by loosening the clamping bolts 35 and the removed blade can either be repaired, adjusted radially, or replaced by another with very little work and in a short time, which makes long and expensive delays due to breakage unnecessary and which also makes it practical to adjust the blades radially to obtain the height of dam desired.

For the purpose of holding the several blades in operative position and for releasing them at predetermined intervals, a stop and release mechanism has been provided which will now be described. A stop comprising the two oppositely curved arms 43 is pivotally attached to the frame members 20 by bolts or pivot pins 44. A roller 45 is positioned between the movable ends of the arms 43. A spring 46 extends from one or both of the arms 43 to a frame member 20 and is tensioned so as to urge the arms in a counterclockwise direction. Secured to the side frame members 20 are two vertically extending standards 48 that are provided at their upper ends with bearings 49 in which the shaft 50 is mounted for rotation. Collars 51 are secured to the shaft and hold it from axial movement in the bearings. One end of shaft 50 projects beyond the frame member and is provided with a sprocket wheel 52 positioned in the plane of sprocket wheel 25 and this is connected with the latter by means of a suitable sprocket chain 53. Whenever the pin wheel rotates and turns the sprocket wheel 25, a similar rotary movement will be imparted to the sprocket wheel 52 and shaft 50. Secured to the shaft 50 is a cam 54, whose outer surface has been shown as a spiral and is provided with at least one tooth 55 facing in the direction of rotation. A pawl 57 is connected to the arms 43 by means of a pin 57 and is urged downwardly or in a clockwise direction by a spring 58. This pawl is provided with a tooth 59 that is so positioned that, as the cam rotates, it will engage the tooth 59 and move the pawl 56 and the arms 43 in a clockwise direction, thereby releasing the dammer blade, whereupon the dammer will rotate as the mechanism moves forwardly. Immediately after the blade has been released, the two teeth 55 and 59 will disengage and return to position for engaging the next dammer blade when it arrives to the position shown in Figure 1.

It will be observed from an inspection of the drawings that the pin wheel performs two functions; it serves to support the damming device so as to hold the dammer blades a predetermined distance above the bottom of the lister furrow. Since the pin wheel consists of a plurality of spokes and has no felloe or rim, the spokes will penetrate the loose ground and rest on the bottom of the furrow in the manner shown in the drawings. The pin wheel also serves to rotate the cam which operates the stop or trigger and the damming device is therefore self-contained and does not depend on power derived from any other mechanism to stop and release the dammer blades. When the pin wheel passes over a dam, the spokes will penetrate the loose dirt of which the latter is composed and will therefore not raise the damming device any considerable distance, thereby assuring that the depth of the seed bed will not materially thicken due to the passage of the pin wheel over the dams.

In Figure 1 the damming device has purposely been shown to a larger scale than the truck comprising the wheel 12 and frame 13, for the purpose of showing the elements more clearly. A suitable hoisting mechanism may be provided for the purpose of holding the dammer in elevated position while transporting it over roads and fields, and this has been indicated in a diagrammatic manner in Figure 1 where reference numeral 60 designates an upwardly and rearwardly ranging member that is supported on a downwardly extending compression member 61 and is provided at its upper end with some hoisting mechanism such as a small winch 62. A cable 63 has been shown as extended from the hoist to the damming device. It is to be understood that the lifting mechanism is merely indicative of means and that a similar means can be provided when the dammer is attached to a lister plow or seeder in the manner shown in Figure 3. The arrangement shown in Figures 1 and 2, as above stated, is intended as a replacement of the three bladed dammer mechanism shown in Patent No. 2,308,536, in which a supporting frame is interposed between the dammer and the seeder.

In Figure 3 the damming device has been shown as attached to a lister seeder by securing to the sides of the beam 64 plates 65 that project rearwardly and between which the lug 17 projects. The dammer that has been described above is attached to the lister beam and to the plate 65 and by means of a pivot pin 16. The dammer is otherwise constructed in the manner already described. In Figure 3, reference numeral 66 designates the top of the field and reference numeral 67 the bottom of the furrow that has been cut by the chisel 68. In Figure 3 a seeding attachment has also been shown, which consists of a hopper 69 and a feed mechanism comprising the sprocket wheel 70 that is rotated by power derived from the sprocket wheel 71 and transmitted to it by means of a sprocket chain 72. The feed mechanism delivers grain to the flexible tubes 73 and into the interior of the sleds 74 that are outwardly inclined in the manner shown, described and claimed in my copending application, Serial No. 463,343, filed November 3, 1942.

In Figures 3 and 4 the seeder has been shown as sowing two spaced parallel rows in each lister furrow, but so far as this invention is concerned, the seeder may be of a type sowing a single row of seed. With the type of sleds employed, the grain is deposited in the inclined sides of the lister furrow, which has some marked advantages over the old method of planting the seeds through vertically extending sleds because in the latter case the furrow fills with dry powdered soil, whereas, with the outwardly extending seed sleds the seed is covered with moist ground. This has all been explained in the patent above identified.

During the fallow season the seeding attachment may be removed from the lister in which case the damming device remains attached in the manner shown.

Attention will now be directed to several important features of this invention.

With the ordinary type of dammer where the damming blades are released at some predetermined distances apart, the dams will not be uniform in height as the amount of dirt collected during a predetermined distance of travel will vary with the conditions of the soil and the positions of the damming blades with respect to the bottom of the furrow. With such dammers the dams are often oversize, which is objectionable, and they are also sometimes very much under size, which is also objectionable. The ordinary dammer blades or shovels are made from a rigid piece of steel and become covered with soil near their upper ends because the powdered condition of the soil will not permit them to scour except near the lower end where they are in closer engagement with the firmer part of the soil. After the blades have thus accumulated a layer of soil, they do not function in the best manner, but serve merely to push the accumulated ground forwardly. With the dammer blades shown and described above, only the lower cutting edge or portion is formed from sheet metal as the upper portion is formed from some flexible material such as heavy canvas. Due to the flexibility of the upper portion of the blades, that part designated by reference numeral 29 will not permit caked soil to adhere to it because, due to its flexibility, it will always bend and shed the accumulated soil during its upward movement after each release.

It will also be observed that with the construction shown and described herein the dammer blades are supported by U-shaped frames formed from steel bars 36 and that these frames are attached to spaced hubs comprising the plates 31 and 32. As a result of this construction the soil is free to pass over the tops of the blades and flow downwardly as indicated by reference numeral 75 in Figures 1 and 3. This overflow assures that the dams will all be of uniform size so long as sufficient dirt is accumulated to produce an overflow like that shown in the drawing.

Attention is further directed to the fact that the two pairs of hub plates are not connected by a shaft during operation and therefore there will be no obstruction and nothing on which weeds and stubble can collect; the dammer will therefore not clog as it is most likely to do when the blades are constructed as shown in Patent No. 2,308,536 and Patent No. 2,284,172 above identified. This open construction is of great practical importance in forming dams of uniform height.

Although when the dammer is properly designed the need of vertical adjustment to accommodate it to different conditions is very seldom felt, in the construction shown and above described, such minor adjustments as may be necessary can be effected by loosening the clamping disks 27 and moving the radial spokes or bars 28 inwardly or outwardly to effect the desired adjustment. It is also possible to adjust the radial length of the dammer blades, as above explained. It is, of course, possible to provide a more elaborate adjusting mechanism controlled by some easily accessible lever, but since agricultural machines are nearly always provided with similar adjusting means, it is believed that any old and well known adjusting means can be selected if a more convenient method of effecting adjustment than the one herein pointed out is desired.

In the above description and on the drawings, the dammer blades have been described and shown as a three-blade rotary assembly. The spiked gauge and detent operating wheel at the rear of the frame can naturally be employed for the same purpose, even if another construction of dammer blade and detent mechanism is employed, as its function is to gauge the depth of the blade cut and to furnish power for operating the detent.

Having described the invention what is claimed as new is:

1. In combination with a furrow forming implement, a damming attachment comprising an elongated frame having means at one end for effecting a nonrotating supporting connection permitting vertical and lateral movement of the frame with the implement, a dammer blade carried by the frame and mounted for movement into and out of operative position, a supporting wheel rotatably connected with the frame at a point to the rear of the dammer blade, said wheel serving as a depth gauge for the dammer blade and comprising a hub with radially extending spokes adapted to penetrate the loose soil, a detent mechanism carried by the frame, said detent mechanism being normally positioned to hold the dammer blade in soil engaging position and comprising a cam mounted for rotation, and means for rotating the cam by power derived from the supporting wheel.

2. A damming attachment for lister seeders comprising an elongated frame, means at the front end for effecting a supporting connection with the seeder, a dammer blade connected with the frame for movement into and out of soil engaging position, a supporting wheel rotatably connected with the frame at the rear of the blade, said wheel serving as a depth gauge for the dammer and comprising a hub having radially extending spokes whose ends are free to penetrate the loose soil, and a detent mechanism for holding the dammer blades in soil engaging position and for releasing the same, said means comprising a cam, and means for rotating the cam by power derived from the rotating supporting wheel.

3. A damming attachment for lister seeders, comprising a frame having spaced parallel side members, the front ends of which are connected to form an elongated U-shaped frame, bearings on each side, a multiple scraper blade assembly positioned between the sides and mounted for rotation in the bearings, a stop means carried by the frame and biased to blade engaging position, means for moving the stop to inoperative position and then releasing it in response to lineal movement of the attachment, the last mentioned means comprising a wheel mounted for rotation between the side members, to the rear of the scraper blade assembly, and positioned to engage the ground to limit the downward movement of the frame, and means operated by the rotation of the wheel for controlling the stop.

4. A damming attachment for a lister seeder comprising, a frame having two spaced sides connected with each other at one end, draft means connected to the closed end, a supporting wheel positioned between the sides of the frame at the other end thereof, a rotatable scraper blade assembly mounted for rotation in the frame, between the wheel and the draft means, a stop element movably connected with the frame and normally biased to scraper blade engaging position, and means responsive to the rotation of the supporting wheel for moving the stop and releasing the scraper blade assembly.

5. A device in accordance with claim 4 in which the supporting wheel periphery is formed from radially extending pins which penetrate loose soil.

C. T. PEACOCK.